Patented Mar. 30, 1943

2,315,087

UNITED STATES PATENT OFFICE 2,315,087

PREPARATION OF PHENOL-UREA-FORM-ALDEHYDE RESINS

Pierre Cuvier, Paris, France; vested in the Alien Property Custodian

No Drawing. Application March 12, 1941, Serial No. 383,014. In France March 7, 1940

8 Claims. (Cl. 260—45)

My invention concerns synthetic resins and more particularly those synthetic resins which are obtained by the condensation of formaldehyde with certain other compounds. Its object is more particularly a process of preparation of resins of this nature, which process results in the obtaining of perfectly transparent resins, insoluble in usual solvents and offering a perfect resistance to the action of water.

Known resins basically composed of formaldehyde present but partially the advantageous properties enumerated hereabove. They are either transparent and insoluble in usual solvents (resins of the urea-formaldehyde type) but present the very serious disadvantage of not offering a perfect resistance to the action of water, or they offer a perfect resistance to the action of water, but are colored when stable (resins of the phenol-formaldehyde type).

It has already been suggested that a mixed urea-phenolic resin be prepared by dissolving the condensation product of urea with five parts in weight of formaldehyde at 40% in a solution of salicylic acid, in a mixture of ethyl alcohol, butanol and ethyl lactate.

It is also known that it is possible to prepare mixed resins of the nature hereabove described by causing a condensing reaction in a mixture of urea, of formaldehyde, ethyl lactate and phenol.

These processes are not exempt from disadvantages; in particular, by mixing, with an urea-formaldehyde condensation product, a phenol the reaction of which is acid, the mass runs the risk of gelatinizing. The substance obtained is then infusible and insoluble and consequently cannot be utilized. Moreover, it is not possible to incorporate a very large quantity of phenol, so that despite the fact that the product obtained presents more interesting properties than those of urea-formaldehyde resins, the problem is nevertheless not entirely solved.

The process of my invention obviates these disadvantages and results in the formation of a perfectly stable product which is resistant and transparent. It consists substantially in preparing first of all a primary condensation product of phenol and formaldehyde. The condensation which leads to the formation of this primary product is effected, preferably, in the presence of a catalytic agent such as ammonium carbonate.

In a second phase, the primary phenol-aldehyde condensation product prepared in the preceding phase is put into a mixture of neutralized aldehyde and urea. The condensation of the constituents of the mixture thus obtained is then accelerated by raising the temperature, and is catalyzed by catalytic agents constituted preferably by metals such as zinc, magnesium, lead, vanadium, manganese, etc., alone or compounded. These metals combine first of all with the resin, then when the formation of the latter is completed, they separate in the form of an insoluble resin which is filtered. This secondary reaction is assisted by the incorporation of a second catalytic agent such as copper, platinum, nickel, etc.

It is of course understood that this process is not limited to the utilization of phenol and urea, the formulas of which are respectively: $C_6H_5OH$ and $CO(NH_2)_2$. Finally, the term formaldehyde includes the compounds capable of generating formaldehyde under the action of heat.

The second phase of the condensation being completed, the product obtained is freed from the metallic catalytic agent by filtering. At this point, it is possible to incorporate into it plasticizing agents, pigments, filling bodies, etc.

The dehydrating which follows is carried on more or less depending upon the nature of the product which it is desired to obtain. In order to prepare resins which can be molded or resins for varnishes, it is preferable not to go beyond from 100° to 105° C. at atmospheric pressure. In the case of molding powders the resin is dried by heating to a temperature which may reach from 140° to 150° C. at atmospheric pressure, and is then allowed to cool, and then pulverized. These resins, insoluble in water, but soluble in alkaline solutions, polymerise under the action of heat, of pressure or of both combined. This polymerisation may be accelerated in a well known manner by incorporating into the mass metallic salts alone, or mixed with mineral or organic acids or with oxidizing agents.

The following practical embodiments of my invention, not inclusive of all practical applications, will allow a good understanding of how my invention may be achieved. In these embodiments, the parts indicated are on a weight basis.

Example 1

The following mixture (a) is prepared:

| | Parts |
|---|---|
| Phenol ($C_6H_5OH$) | 420 |
| Formaldehyde at 40% | 280 |
| Ammonium carbonate | 20 | and is heated to the boiling point which is maintained for about 30 minutes.

Apart from the above mixture, a mixture (b) is prepared which is composed as follows:

| | Parts |
|---|---|
| Urea (CO(NH$_2$)$_2$) | 430 |
| Formaldehyde at 40% | 1000 |
| Ammonium carbonate | 6 |
| Zinc | 10 |
| Copper | 0.5 |

Mixture (a) is then put into mixture (b) and the whole mass is heated to a temperature of 80° C. which is maintained for about 15 minutes.

The reaction mixture is then filtered after cooling, and eventual additions of plasticizing agents, fillers, pigments, etc., can then be made.

During the dehydrating operation which follows, it is advantageous not to exceed 105° C. for poured resins, whereas it is permissible to attain from 140° to 150° C. for molding powders.

*Example 2*

Mixture (a) is composed as follows:

| | Parts |
|---|---|
| Phenol | 230 |
| Formaldehyde at 40% | 120 |
| Ammonium carbonate | 8 | whereas mixture (b) is composed of:

| | Parts |
|---|---|
| Urea | 430 |
| Formaldehyde at 40% | 1000 |
| Ammonium carbonate | 6 |
| Zinc | 4 |
| Copper | 0.2 |

The method of proceeding is identical to the one described in Example 1.

One of the main advantages of the present process is to be found in the possibility of condensing any relative quantities whatsoever of urea and phenol. It is sufficient, to this end, to add to these compounds an equal quantity of formalin and the catalytic agents. It is thus possible to prepare a series of resins which possess intermediate properties between those of phenol-formaldehyde resins and those of urea-formaldehyde resins.

It is obvious that the embodiment which has just been described has only been given by way of example and that it is possible to modify the present process without going beyond the scope of the invention. For instance, it is possible to first combine the urea with the initial phenol-formaldehyde condensation product, then incorporate the formaldehyde to achieve the second phase of the condensation.

What I claim is:

1. The method of producing transparent, water-resistant resins which comprises partially condensing phenol and formaldehyde in the presence of an alkaline catalyst, adding thereto a neutralized mixture of urea and formaldehyde, and continuing the condensation of the mixture in the presence of a metallic catalyst of the group consisting of zinc, magnesium, lead, vanadium and manganese.

2. The method of producing transparent, water-resistant resins which comprises partially condensing phenol and formaldehyde in the presence of an alkaline catalyst, adding thereto a neutralized mixture of urea and formaldehyde, and continuing the condensation of the mixture in the presence of zinc.

3. The method of producing transparent, water-resistant resins which comprises partially condensing phenol and formaldehyde in the presence of an alkaline catalyst, adding thereto a neutralized mixture of urea and formaldehyde, and continuing the condensation of the mixture in the presence of a primary catalyst selected from the group consisting of zinc, magnesium, lead, vanadium and manganese, and a secondary catalyst selected from the group consisting of copper, platinum and nickel.

4. The method of producing transparent, water-resistant resins which comprises partially condensing phenol and formaldehyde in the presence of an alkaline catalyst, adding thereto a neutralized mixture of urea and formaldehyde, and continuing the condensation of the mixture in the presence of metallic zinc and a metal selected from the group consisting of copper, platinum and nickel.

5. The method of producing transparent water-resistant resins which comprises partially condensing phenol and formaldehyde in the presence of an alkaline catalyst, adding thereto a neutralized mixture of urea and formaldehyde, and continuing the condensation of the mixture in the presence of metallic zinc and metallic copper.

6. A transparent, water-resistant resin obtained by mixing with a partially condensed phenol-formaldehyde resin, condensed under basic conditions, a neutral mixture of urea and formaldehyde, followed by a final condensation of the mixture in the presence of a metal selected from the group consisting of zinc, magnesium, lead, vanadium and manganese.

7. A transparent, water-resistant resin obtained by mixing a phenol-formaldehyde resin, partially condensed under basic conditions, with a neutral mixture of urea and formaldehyde, and finally condensing in the presence of a catalyst selected from the group consisting of zinc, magnesium, lead, vanadium and manganese, and a secondary catalyst selected from the group consisting of copper, platinum and nickel.

8. A transparent, water-resistant resin obtained by mixing a phenol-formaldehyde resin, partially condensed under basic conditions, with a neutral mixture of urea and formaldehyde, and finally condensing in the presence of metallic zinc and metallic copper.

PIERRE CUVIER.